A. G. PAXTON.
NUTCRACKER.
APPLICATION FILED AUG. 6, 1915.
1,219,859.
Patented Mar. 20, 1917.
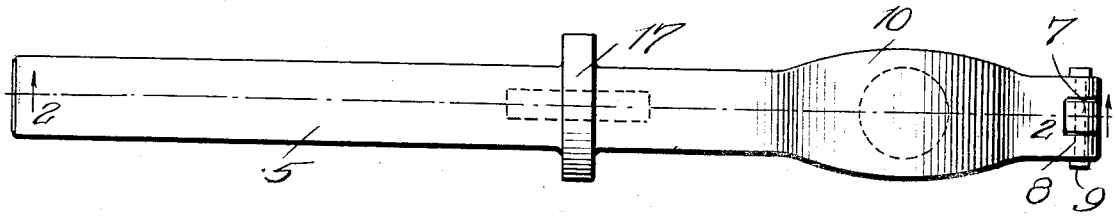
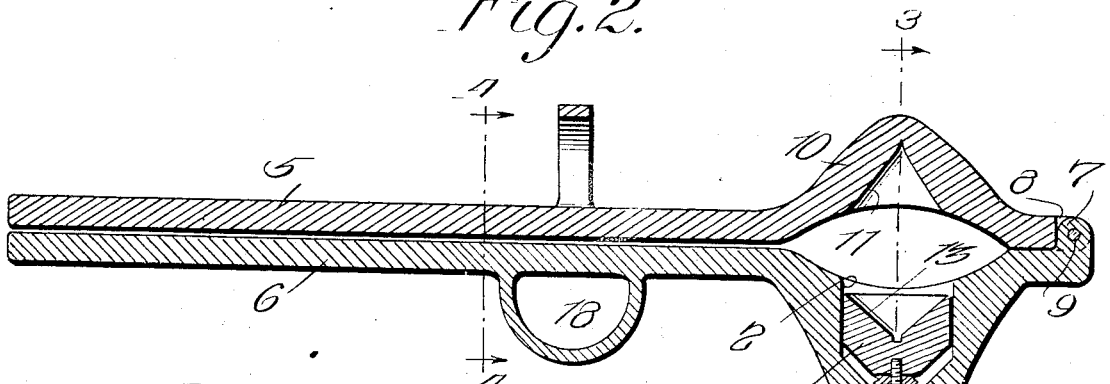
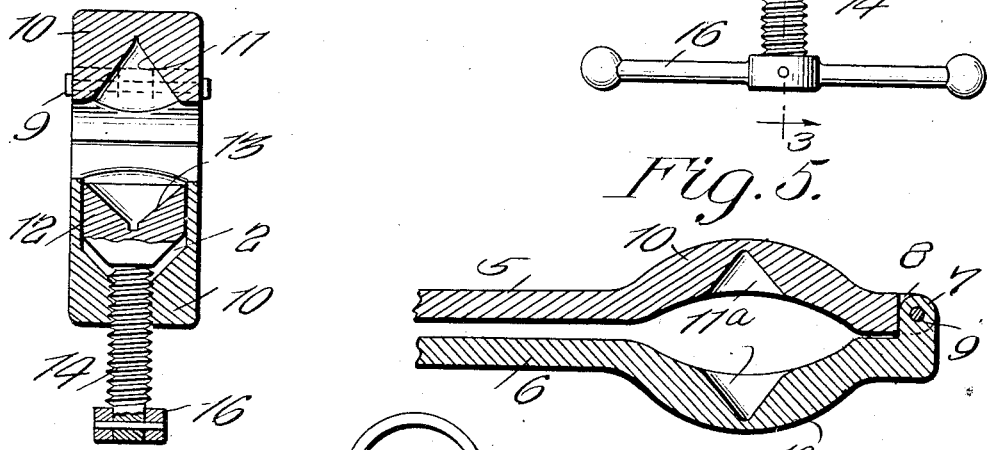
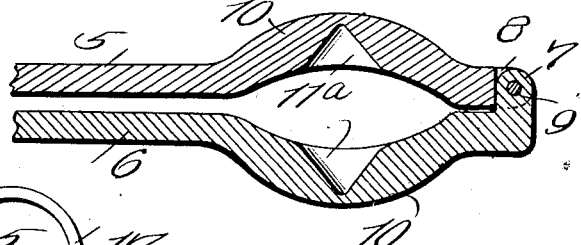
WITNESSES:
INVENTOR
Alexander G. Paxton
BY Munn & Co.
ATTORNEYS

UNITED STATES PATENT OFFICE.

ALEXANDER GALLATIN PAXTON, OF GREENVILLE, MISSISSIPPI.

NUTCRACKER.

1,219,859.

Specification of Letters Patent. Patented Mar. 20, 1917.

Application filed August 6, 1915. Serial No. 44,025.

*To all whom it may concern:*

Be it known that I, ALEXANDER G. PAXTON, a citizen of the United States, and a resident of Greenville, in the county of Washington and State of Mississippi, have invented a certain new and useful Improvement in Nutcrackers, of which the following is a specification.

One of the principal objects of my invention contemplates an improved nut cracker in which an adjustable and a stationary seat are provided adjacent the pivoted ends of the lever whereby different sized nuts may be readily accommodated, and whereby the pressure exerted may be used to a maximum degree in thoroughly cracking the nuts, the adjustable seat being provided with means whereby it may be shifted toward and away from the stationary seat, in order that further pressure may be exerted upon the nut after the levers have been brought together.

A further object of the invention is to provide a nut cracker having an adjustable nut seat whereby various sized nuts may be accommodated without necessitating further movement of the handles apart beyond an ordinary degree.

A still further object of the invention is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed and illustrated in the accompanying drawing in which like characters of reference indicate like parts throughout the several figures, of which—

Figure 1 represents a top plan view of a nut cracker constructed according to my invention.

Fig. 2 represents a vertical central longitudinal sectional view taken therethrough on the plane indicated by the line 2—2 of Fig. 1, looking in the direction indicated by the arrow.

Fig. 3 represents a vertical transverse sectional view taken on the plane indicated by the line 3—3 of Fig. 2, looking in the direction indicated by the arrow.

Fig. 4 represents a transverse vertical sectional view taken on the plane indicated by the line 4—4 of Fig. 2, looking in the direction indicated by the arrow, and Fig. 5 represents a fragmentary view similar to Fig. 2 showing a nut cracker in which stationary seats only are provided.

In carrying out my invention I provide a pair of handles or levers 5 and 6 preferably formed each of a length of suitable metal, one of said handles being provided at one end with an offset ear 7 extending into the bifurcated end 8 of the opposite lever, a pin 9 being extended through the parts for pivoting the handles together.

Each of the handles or levers is bowed outwardly as at 10 adjacent the pivotal point of the device. The outwardly bowed portions are thickened as shown, and in the handle 5 centrally of the bowed portion is provided a cone-shaped recess or seat 11. In the opposite bowed portion which is somewhat thicker and stronger and at a point opposite the seat 11, is provided a recess 2 having straight walls and having a substantially cone-shaped bottom. Arranged within the recess 2 for reciprocation toward and away from the seat 11, is an adjustable nut seat 12. The latter is substantially cone-shaped and is provided with straight outer walls which rest against the straight walls of the recess 2. A cone-shaped recess 13 substantially similar to the seat 11 is provided in the adjustable nut seat 12. The seat 12 snugly fits within the recess 2 and is of a thickness or depth less than the depth of the recess, whereby said seat may be shifted in the recess toward and away from the seat 11.

Swivelly connected to the apex of the adjustable seat 12 is a screw 14 which extends through a threaded opening provided in the bowed portion 10 of the handle 6 in alinement with the seats 11 and 12. The outer end of this screw is provided with a cross arm 16 whereby the screw may be turned at will for shifting the seat 12 toward and away from the stationary seat 11 provided in the opposite handle.

The handle 5 is provided with a transversely arranged substantially annular thumb guard 17, while the handle 6 is provided with a longitudinally extending similar guard 18. The guard 18 is adapted to receive the forefinger of the hand of the operator, while guard 17 receives the operator's thumb in order that the levers may be moved toward and away from each other in engaging and compressing a nut.

In operation the handles are adapted to be shifted apart and a nut placed between the seats 11 and 13, one end of the nut resting in each seat. By having these seats cone-shaped, nuts of varying diameters and configurations may be readily accommodated. Upon movement of the levers toward each other, the pressure will be directed upon the nut and the latter will be crushed.

The adjustable seat is provided so that nuts of various sizes may be readily accommodated without necessitating the movement of the handles outside of the ordinary paths of oscillation. A further advantage obtained by this construction resides in the thorough compression of the nut after the handles have been moved into engagement with each other in crushing the nut.

By having the adjustable and stationary seats cone-shaped as shown, the ends of the nut will be arranged in the apices of the seats and the wider portions of the seat will provide room for the expansion of the nut as it is being cracked, so that the pieces of shell will not fly about as they do when the ordinary nut crackers are used.

The form of the device shown in Fig. 5 is similar to that already set out, except that the bowed portions 10 are each provided with a stationary cone-shaped seat 11ª and are not thickened to the extent indicated in Fig. 2.

Although I have described the preferred embodiment of my invention, I may desire to make such changes in the construction, combination, and arrangement of parts thereof as do not depart from the spirit of the invention and the scope of the appended claims.

I claim:—

1. A nut cracker comprising a pair of handles pivotally connected together at one end and being provided adjacent their pivot point with outwardly bowed and thickened portions, a stationary substantially cone-shaped seat provided in one of the bowed portions, a recess provided in the opposite bowed portion and having straight side walls, a cone-shaped adjustable seat arranged within the recess opposite the first mentioned seat and having straight outer walls snugly fitting the walls of the recess, a screw arranged in a threaded opening provided adjacent the said recess, a swivel connection between the screw and the adjustable seat, and a cross arm provided on the screw whereby the latter may be turned at will for shifting the adjustable seat toward and away from the stationary seat.

2. A nut cracker including a pair of levers movable toward and away from each other, a stationary nut seat provided in one of the levers, an adjustable nut seat arranged in a recess in the other lever at a point opposite the stationary nut seat, said adjustable nut seat being guided and supported by the walls of the recess, and means for adjusting the adjustable nut seat relatively to the stationary nut seat.

3. A nut cracker comprising a pair of pivotally connected levers having outwardly bowed portions, a stationary nut seat provided on one of the bowed portions, an adjustable nut seat provided on the opposite bowed portion and means for guiding and laterally supporting said adjustable nut seat.

Signed July 23rd, 1915, in presence of witnesses.

ALEXANDER GALLATIN PAXTON.

Witnesses:
R. L. JAYNE,
L. A. BELL.